United States Patent
Freeman et al.

(10) Patent No.: US 9,350,714 B2
(45) Date of Patent: May 24, 2016

(54) DATA ENCRYPTION AT THE CLIENT AND SERVER LEVEL

(71) Applicant: International Business Machines Corporation, Armonk, NY (US)

(72) Inventors: William C Freeman, Marietta, GA (US); Richard V Hom, Troy, MI (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 148 days.

(21) Appl. No.: 14/083,965

(22) Filed: Nov. 19, 2013

(65) Prior Publication Data

US 2015/0143117 A1 May 21, 2015

(51) Int. Cl.
*H04L 29/06* (2006.01)
*H04L 29/08* (2006.01)

(52) U.S. Cl.
CPC .......... *H04L 63/0428* (2013.01); *H04L 63/061* (2013.01); *H04L 67/1097* (2013.01); *H04L 63/168* (2013.01)

(58) Field of Classification Search
CPC . H04L 63/0428; H04L 67/10; H04L 67/1097; H04L 63/061; H04L 63/168
USPC ................ 726/26, 28, 30; 713/190, 155, 181; 380/37, 264, 28
See application file for complete search history.

(56) References Cited

U.S. PATENT DOCUMENTS

| | | | | |
|---|---|---|---|---|
| 5,978,477 A * | 11/1999 | Hull | .............. | G06Q 99/00 358/403 |
| 6,223,287 B1 * | 4/2001 | Douglas | .............. | H04L 63/0428 380/255 |
| 6,704,118 B1 * | 3/2004 | Hull | .............. | G06Q 99/00 358/1.15 |
| 6,931,532 B1 * | 8/2005 | Davis | .............. | G06F 21/6209 380/273 |
| 6,941,459 B1 * | 9/2005 | Hind | .............. | G06F 17/227 380/273 |
| 6,961,849 B1 * | 11/2005 | Davis | .............. | G06F 21/6227 380/273 |
| 6,978,367 B1 * | 12/2005 | Hind | .............. | G06F 21/577 380/273 |
| 8,595,508 B2 * | 11/2013 | Yuen | .............. | H04L 9/12 705/75 |
| 8,813,247 B1 * | 8/2014 | Alten | .............. | G06F 21/31 380/45 |
| 2002/0018565 A1 * | 2/2002 | Luttrell | .............. | H04N 7/1675 380/217 |
| 2002/0091734 A1 * | 7/2002 | Redlich | .............. | G06F 21/6209 715/234 |
| 2002/0091925 A1 * | 7/2002 | Suzuki | .............. | G06F 21/10 713/168 |
| 2002/0178353 A1 * | 11/2002 | Graham | .............. | H04L 12/5875 713/151 |
| 2003/0046362 A1 | 3/2003 | Waugh et al. | | |
| 2003/0081791 A1 * | 5/2003 | Erickson | .............. | G06F 21/606 380/282 |

(Continued)

FOREIGN PATENT DOCUMENTS

WO 2006012638 A2 2/2006
WO 2010019916 A1 2/2010

*Primary Examiner* — David Garcia Cervetti
(74) *Attorney, Agent, or Firm* — Michael LeStrange; Andrew M. Calderon; Roberts Mlotkowski Safran & Cole, P.C.

(57) ABSTRACT

Embodiments of the present invention include a computer system and computer program product for implementing encryption of data. A computer system determines that a first data field of a plurality of data fields of a web form requires encryption. The computer system tags the first data field with one or more HTML encryption tags. The computer system displays the web form to a user. The computer system receives user input, wherein at least a portion of the user input is contained in the first data field of the web form. The computer system encrypts the first data field on a first computer, wherein a first user specific encryption key is associated with at least the first data field. The computer system inserts the encrypted first data field into at least one record stored on a second computer.

20 Claims, 5 Drawing Sheets

(56) References Cited

U.S. PATENT DOCUMENTS

| | | | |
|---|---|---|---|
| 2003/0182578 A1* | 9/2003 | Warnock | G06K 9/00469 713/176 |
| 2003/0196114 A1 | 10/2003 | Brew et al. | |
| 2004/0059945 A1* | 3/2004 | Henson | G06F 21/6209 726/28 |
| 2004/0078595 A1* | 4/2004 | Kent, Jr. | G06Q 10/107 713/160 |
| 2004/0181679 A1* | 9/2004 | Dettinger | H04L 63/0428 713/193 |
| 2004/0267595 A1* | 12/2004 | Woodings | G06Q 10/06 705/7.14 |
| 2005/0039034 A1* | 2/2005 | Doyle | H04L 9/0825 713/193 |
| 2005/0134896 A1* | 6/2005 | Koga | G06F 21/608 358/1.14 |
| 2005/0235165 A1* | 10/2005 | Gomez | G06F 17/30905 713/193 |
| 2006/0050879 A1* | 3/2006 | Iizuka | G09C 3/08 380/51 |
| 2006/0075228 A1* | 4/2006 | Black | H04L 63/0428 713/167 |
| 2006/0107325 A1* | 5/2006 | Kanestrom | G06F 21/6209 726/26 |
| 2006/0161878 A1* | 7/2006 | Koh | G06F 8/10 717/100 |
| 2007/0022285 A1* | 1/2007 | Groth | G06F 21/80 713/155 |
| 2007/0067837 A1* | 3/2007 | Schuster | H04L 63/0209 726/11 |
| 2007/0150299 A1* | 6/2007 | Flory | G06Q 10/10 705/51 |
| 2007/0162961 A1* | 7/2007 | Tarrance | G06F 21/33 726/5 |
| 2007/0258594 A1 | 11/2007 | Sandhu et al. | |
| 2008/0016064 A1* | 1/2008 | Sareday | G06F 17/30914 |
| 2008/0037789 A1* | 2/2008 | Motohashi | G06F 21/6227 380/277 |
| 2008/0212782 A1* | 9/2008 | Brettle | H04L 9/0894 380/277 |
| 2009/0106550 A1* | 4/2009 | Mohamed | H04L 63/045 713/156 |
| 2009/0129591 A1* | 5/2009 | Hayes | G06F 21/608 380/51 |
| 2009/0138503 A1* | 5/2009 | Chowdhury | G06F 17/30961 |
| 2009/0147949 A1 | 6/2009 | Kirovski | |
| 2009/0254572 A1* | 10/2009 | Redlich | G06Q 10/06 |
| 2010/0060504 A1* | 3/2010 | Kim | H04N 5/44582 341/176 |
| 2010/0083241 A1* | 4/2010 | Kobayashi | G06F 21/572 717/168 |
| 2010/0325421 A1* | 12/2010 | Park | H04L 9/32 713/153 |
| 2011/0072264 A1* | 3/2011 | McNulty | G06F 21/32 713/168 |
| 2012/0078798 A1* | 3/2012 | Downing | G06Q 20/382 705/64 |
| 2012/0210126 A1* | 8/2012 | Johnson | G06F 17/30 713/165 |
| 2012/0290837 A1* | 11/2012 | Vion-Dury | H04L 9/14 713/167 |
| 2012/0317415 A1* | 12/2012 | Li | G06F 21/6263 713/165 |
| 2013/0227279 A1* | 8/2013 | Quinlan | H04L 63/0428 713/165 |
| 2013/0227280 A1* | 8/2013 | Quinlan | H04L 9/0822 713/165 |
| 2013/0254548 A1* | 9/2013 | Greene | H04L 63/0807 713/189 |
| 2013/0254549 A1* | 9/2013 | Greene | G09C 5/00 713/189 |
| 2013/0254550 A1* | 9/2013 | Greene | G06F 21/64 713/189 |
| 2013/0254551 A1* | 9/2013 | Greene | G06F 17/00 713/189 |
| 2013/0254552 A1* | 9/2013 | Greene | G06F 21/64 713/189 |
| 2013/0254553 A1* | 9/2013 | Greene | G06F 21/10 713/189 |
| 2013/0254554 A1* | 9/2013 | Greene | G06F 21/6209 713/189 |
| 2013/0254555 A1* | 9/2013 | Greene | G06F 21/10 713/189 |
| 2013/0340028 A1* | 12/2013 | Rajagopal | H04L 63/08 726/1 |
| 2014/0032901 A1* | 1/2014 | Savage | G06Q 20/383 713/167 |
| 2014/0095878 A1* | 4/2014 | Shimano | H04L 9/0825 713/171 |

* cited by examiner

DATA ENCRYPTION AT THE CLIENT AND SERVER LEVEL

FIELD OF THE INVENTION

The present invention relates generally to the field of data protection, and more specifically to selective encryption of sensitive data.

BACKGROUND

Sensitive/confidential data may be entered by a user at a client computer. For example, a doctor, nurse or even a medical receptionist may enter sensitive data such as medical conditions or symptoms, medications, date of birth, social security number, insurance card number and credit card number into one or more medical forms. Typically, the data is sent to and stored at a central server so it is centrally available for access by client computers at different locations and for security reasons in case a client computer is hacked.

Data transmitted between client computers and servers is vulnerable to interception by hackers in both directions. Protocols such as Secure Socket Layer (SSL) or Transport Layer Security (TLS) allow for an encrypted secure bi-directional connection between a client computer and a mail server or web server. These protocols use asymmetric cryptography for authentication, and then symmetric encryption for the actual data transmission. This helps to protect sensitive data from hackers who eavesdrop on transmitted data, or change data in transit.

Computer databases allow the storage of digital data in an organized format that allows for searches to retrieve a particular subset of data utilizing specialized commands in a query language, such as Structured Query Language (SQL). SQL allows data entry, manipulation, and deletion. SQL statements may be generated by a client application based on user input or stored in database procedures to be run on a schedule or on request by a Database Administrator (DBA). The SQL is executed by a Database Management System (DBMS), which is a software system, which allows the administration of a database and to control access to a database. Databases may be encrypted as a whole to protect from hackers who may gain access to the database.

Within a database, some data tables may contain both user sensitive information, as well as non-sensitive information. Data protection is usually required by administration policy to prevent unauthorized access to sensitive information. Some databases are protected by a generic "userid" or machine identification used by all users within a company or office to access the data. A second method of data protection includes the use of a unique database userid and password for each individual user, along with table definitions that include a field to allow segregation of data by the userid. This last approach requires maintenance by a Database Administrator (DBA) to create a new userid for each user and set permission access by table for each new userid, which can be time consuming. While database files are typically encrypted as a whole, this does not prevent authorized users from gaining access to the data in the table.

Another type of encryption method protects the storage of user private data during transmission onto a server connected storage device. US 2009/0147949 A1 by Microsoft Corporation describes a method wherein a set of symmetric encryption keys is generated by a server at the request of a client computer. The server application stores the set of symmetric encryption keys on the server for a user of the client computer. The keys are sent to the client computer only when needed for encryption or decryption of data on a portable storage device during transmission. The keys are deleted from the client computer when encryption or decryption is completed.

SUMMARY

Embodiments of the present invention include a computer program product and computer system for implementing encryption of data. A computer system determines a first data field of a plurality of data fields of a web form requires encryption. The computer system tags the first data field with one or more HTML encryption tags. The computer system displays the web form to a user. The computer system receives user input, wherein at least a portion of the user input is contained in the first data field of the web form. The computer system encrypts the first data field on a first computer, wherein a first user specific encryption key is associated with at least the first data field. The computer system inserts the encrypted first data field into at least one record stored on a second computer.

DETAILED DESCRIPTION

Embodiments of the present invention allow an individual user to encrypt part or all of the data with an encryption key at the client level prior to transmission to a server application or data storage application program for storage. The encryption key or keys are stored on a local device, such as a client computer, and at least one user encryption key is never sent to the server with the data, which protects the encrypted stored data from decryption by hackers. When user data is retrieved from the data storage location and returned to the client computer, part or all of the data will be decrypted at the client level using the encryption key or keys. If the encryption key or keys of an individual are compromised, only a small portion of the encrypted data in the data storage location may be accessed. This provides an added level of security to the user's private data stored on a server or a server connected storage device.

Embodiments of the present invention allow an individual user to encrypt part or all of the data with a second encryption key at the server level prior to transmission to the data storage application program for storage. The second key is stored locally, and the server copies are removed after use, making this a transient key.

In the preferred embodiment of the present invention, the private data for an authorized user is encrypted at two stages utilizing the following elements: an enhanced web browser, a web application, and an SQL wrapper program. An authorized user fills in a web form through the enhanced browser. The enhancement to the browser allows for usage of HTML tags for identifying certain fields within the web form to be encrypted prior to transmission to the web application. A first encryption key is created, and stored locally on the computer containing the browser. The enhanced browser uses the first encryption key to encrypt the HTML tagged fields. A second encryption key is created, and stored locally on the computer containing the browser. The second encryption key is sent on to the web application along with the encrypted and non-encrypted data from the web form. The web application may perform operations on any non-encrypted data. The web application formats all the data into an SQL statement, and sends the SQL statement and the second encryption key to the SQL wrapper. The SQL wrapper encrypts select data fields within the SQL statement with the second encryption key. The SQL statement is sent to the storage application program which processes the statement. Results from the storage application program are sent back to the SQL wrapper. In the case of a SELECT statement, any resultant dataset is transmitted to the SQL wrapper for decryption. The SQL wrapper uses the second encryption key to decrypt selected data fields in the resultant dataset, and sends the results to the web application. The SQL wrapper and web application remove the second encryption key, making the second encryption key a transient key. The web application may perform operations on any non-encrypted data in the results. The web application formats the results with the HTML encryption tags to identify data fields that need to be decrypted and sends the formatted results to the enhanced browser. The enhanced browser decrypts the tagged fields with the first encryption key and displays the results to the user.

In an alternate embodiment of the present invention, the private data for an authorized user is encrypted at only one stage utilizing the following elements: an enhanced web browser, and a web application. No SQL wrapper exists. An authorized user fills in a web form through the enhanced browser. The enhancement to the browser allows for usage of HTML tags for identifying certain fields within the web form to be encrypted prior to transmission to the web application. A first encryption key is created, and stored locally on the computer containing the browser. The enhanced browser uses the first encryption key to encrypt the HTML tagged fields. The web application may perform operations on any non-encrypted data. The web application formats all the data into an SQL statement, and sends the SQL statement to the storage application program which processes the statement. Results from the storage application program are sent back to the web application. In the case of a SELECT statement, any resultant dataset is transmitted to the web application. The web application may perform operations on any non-encrypted data in the resultant dataset. The web application formats the results with HTML encryption tags to identify data fields that need to be decrypted and sends the formatted results to the enhanced browser. The enhanced browser decrypts the tagged fields with the first encryption key and displays the results to the user. Implementation of embodiments of the invention may take a variety of forms, and exemplary implementation details are discussed subsequently with reference to the Figures.

In another alternate embodiment of the present invention, the private data for an authorized user is encrypted at only one stage utilizing the following elements: a standard web browser, a web application, and an SQL wrapper program. An authorized user fills in a web form through a standard browser. An encryption key is created, and may be stored locally on the computer in an encrypted HTTP cookie, stored on a persistent key store on a server, or may be filled in for each transaction. The key is sent on to the web application along with the data from the web form. The web application may perform operations on the data. The web application formats the data into an SQL statement, and sends the SQL statement and the encryption key to the SQL wrapper. The SQL wrapper encrypts select data fields within the SQL statement with the encryption key. The SQL statement is sent to the storage application program which processes the statement. Results from the storage application program are sent back to the SQL wrapper. In the case of a SELECT statement, any resultant dataset is transmitted to the SQL wrapper for decryption. The SQL wrapper uses the encryption key to decrypt selected data fields in the resultant dataset, and sends the results to the web application. The SQL wrapper and web application remove the encryption key. The web application may perform operations on any data. The web application formats the results and sends the formatted results to the browser for display to the user.

Implementation of embodiments of the invention may take a variety of forms, and exemplary implementation details are discussed subsequently with reference to the figures. The embodiment illustrated in the figures describes the interaction of a relational database and query statements, using SQL as the query language. Specific details disclosed herein are not to be interpreted as limiting, but merely as a representative basis for teaching one skilled in the art to variously employ the methods and structures of the present disclosure. Embodiments of the present invention may apply to all database types, including but not limited to relational, hierarchical, network, and object-oriented databases. Likewise, embodiments of the present invention may apply to other query languages, including but not limited to SQL, QUEL, OQL, and SEQUEL.

The embodiment illustrated in the Figures describes the use of a web browser that displays hypertext-markup language (HTML) based documents. As used herein, the term HTML based document is used generally to refer to any document based on markup languages derived from HTML, such as an Extensible Markup Language (XML) document.

Figure 1:
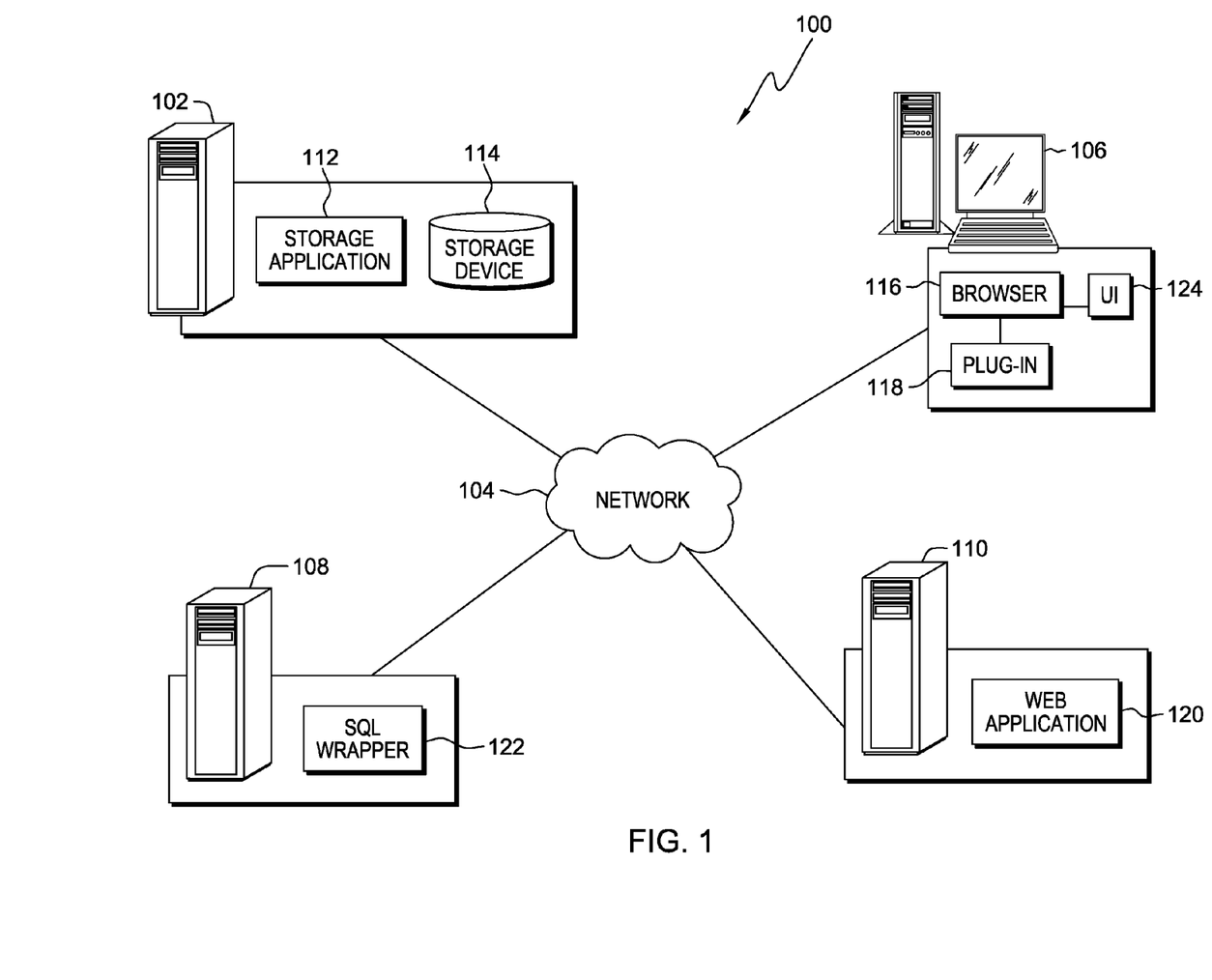
FIG. 1 is a functional block diagram illustrating a distributed data processing system, in accordance with an embodiment of the present invention.

The present invention will now be described in detail with reference to the Figures. FIG. 1 is a functional block diagram illustrating a distributed data processing system, generally designated 100, in accordance with one embodiment of the present invention.

Distributed data processing system 100 includes server computers 102, 108, and 110, and client computer 106, interconnected over network 104.

Server computers 102, 108, and 110 can each respectively be a specialized server computer, an application server, a laptop computer, a tablet computer, a netbook computer, a personal computer (PC), a desktop computer, a personal digital assistant (PDA), a smart phone, or any programmable electronic device capable of communicating with client computer 106, and the remaining server computers via network 104. In certain embodiments, server computers 102, 108, and 110 can each respectively represent a computer system utilizing clustered computers and components that act as a single pool of seamless resources when accessed via network 104, as is common in data centers and with cloud computing applications. In general, server computers 102, 108, and 110 can each respectively be representative of any programmable electronic device or combination of programmable electronic devices capable of executing machine-readable program instructions and communicating with other computing devices via a network. Server computer 102 may include internal and external hardware components, as depicted and described in further detail with respect to FIG. 5.

Server computer 102 includes storage application 112, which executes locally on server computer 102, and storage device 114. In the depicted system, storage application 112 functions as a standard Database Management System. Storage device 114 functions as a database or a collection of related files. Over network 104, storage application 112 receives an SQL statement from a requestor, processes the SQL statement, and sends results back to the requestor. Server computer is connected to the requestor, which may reside on server computer 108 or server computer 110, via network 104. Server computer 102 may also be a node in a distributed database management environment.

Server computer 110 includes web application 120, which executes locally on server computer 110, and has the capability to serve web applications, static HTML based documents, and dynamic HTML based content with encryption tags to client computer 106 via network 104, and has the capability to create and send SQL statements to server computers 102 or 108 via network 104. Server computer 110 may be running an operating system including, but not limited to, Linux® or the IBM® AIX® (Advanced Interactive eXecutive) operating system. (Linux® is a registered trademark of Linus Torvalds in the United States, other countries, or both. AIX is a trademark of International Business Machines Corporation in the United States, other countries, or both.) Server computer 110, which is a web application server, provides the application logic for web application 120. In reality there would be a web server computer in between server computer 110 and client computer 106, but the web server function is not novel and is left out to simplify the illustrated embodiment.

Web application 120 receives data requests, for storage and retrieval, and content requests for web pages from client computer 106 via network 104. Web application 120 serves both static and dynamically-generated HTML web pages to client computer 106 via network 104. Web application 120 formats the web pages, such as forms, with HTML encryption tags for fields that will likely contain sensitive/confidential data input by a user at client computer 106. For example, if the field requests confidential medical information, social security number, insurance card number, credit card number, etc. the web application 120 will attach an encryption tag to the field in the HTML document (representing the form) to alert the web browser at the client computer to encrypt the user-entered data in these fields before returning the document to the web application. Web application 120 formats user-entered data into SQL statements, which are transmitted to either server computer 108 or server computer 102 via network 104. Web application 120 may, for example, run on a J2EE or Java Enterprise Edition (JEE) platform for web applications which provides an application programming interface (API) and runtime environment capable of server side scripting. Web application 120 is described further in FIG. 3.

Server computer 108 includes SQL wrapper 122, which executes locally on server computer 108, and has the capability to encrypt fields in received SQL statements using a transient key, or decrypt fields in a received dataset using a transient key. SQL wrapper 122 receives SQL statements from server computer 110 via network 104, sends SQL statements with encrypted fields to server computer 102 via network 104, and receives datasets from server computer 102 via network 104. SQL wrapper 122 decrypts fields within received datasets prior to transmitting results to server computer 110. SQL wrapper 122 is described further in FIG. 4.

In an alternate embodiment, SQL wrapper 122 may reside on server computer 102 with storage application 112 to conserve resources. Notwithstanding, transferring an encryption key to the same computer containing the storage application program or storage device would lessen the effectiveness of the security provided by encrypting portions of the SQL statement on another server computer.

In an alternate embodiment of the present invention, SQL wrapper 122 and server computer 108 are not needed. Instead, web application 120 transmits SQL statements directly to storage application 112 on server computer 102 via network 104 with no further encryption. Web application 120 would receive any resultant dataset from storage application 112 on server computer 102 via network 104.

Network 104 can be, for example, a local area network (LAN), a wide area network (WAN) such as the Internet, or a combination of the two, and can include wired, wireless, fiber optic, or any other connection known in the art. In general, network 104 can be any combination of connections and protocols that may support communications between server computers 102, 108, and 110, and client computer 106 in accordance with a desired embodiment of the present invention.

In various embodiments of the present invention, client computer 106 can be a laptop computer, a tablet computer, an application server, a netbook computer, a personal computer (PC), a desktop computer, a personal digital assistant (PDA), a smartphone, or any programmable electronic device capable of communicating with server computer 110 via network 104. Client computer 106 includes browser 116 and plug-in 118, which execute locally on client computer 106 and can interface with the user, via UI 124 created by browser 116, for the purpose of data entry, storage and retrieval.

Browser 116 is a web browser or software application capable of displaying content files or HTML pages received from a web application server, such as server computer 110. Browser 116 is capable of sending data to server computer 110 via network 104. Examples of data sent to server computer 110 include, but are not limited to the following: requests for web content, posting of data from a web form, and user login information. Browser 116 receives input from a user and displays output to the user through a user interface, such as UI 124.

Plug-in 118 is a software component fully or partially integrated with browser 116 to extend the markup language of browser 116 to identify data fields needing encryption or decryption by the use of HTML encryption tags within an HTML based document. Plug-in 118 is capable of encrypting or decrypting the tagged fields, depending on the current operation, using a local encryption key. Plug-in 118 has the capability to create one or more encryption keys. In the preferred embodiment, each encryption key is user specific and is created through user input via UI 124. In an alternate embodiment, plug-in 118 may generate each encryption key through internal programming. Plug-in 118 stores locally one or more encryption keys for each user. The integrated actions of browser 116 and plug-in 118 together are described further in FIG. 2.

In an alternate embodiment of the present invention, client computer 106 includes only browser 116 without plug-in 118. In that case, browser 116 is a conventional web browser with no additional capability. Web application 120 does not insert HTML encryption tags into the HTML based documents.

Sensitive user data is received by web application 120, formatted into SQL, and sent on to SQL Wrapper 122 for encryption at the server level.

User interface, UI 124, includes components used to receive input from a user and transmit the input to an application residing on client computer 106. In an exemplary embodiment, UI 124 uses a combination of technologies and devices, such as device drivers, to provide a platform to enable users of client computer 106 to interact with browser 116 and plug-in 118. In the exemplary embodiment, UI 124 receives input, such as textual input received from a physical input device, such as a keyboard, via a device driver that corresponds to the physical input device.

Figure 2:
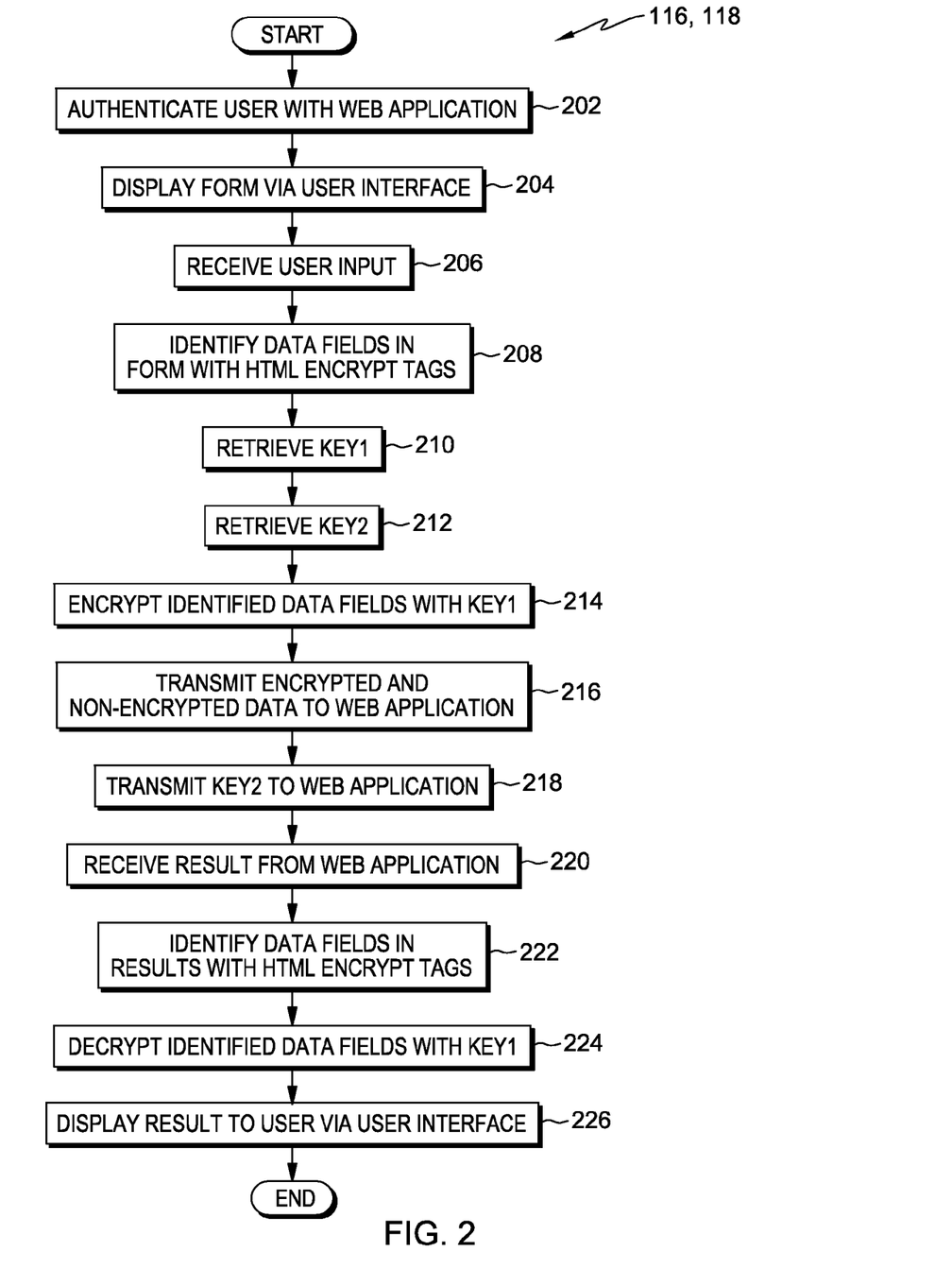
FIG. 2 is a flowchart depicting the operational steps of an enhanced browser performing client level encryption of data fields, inserted on client computer 106 within data processing system 100 of FIG. 1, in accordance with an embodiment of the present invention.

FIG. 2 is a flowchart depicting the operational steps of an enhanced browser performing client level encryption of data fields, inserted on client computer 106 within data processing system 100 of FIG. 1, in accordance with an embodiment of the present invention. In the preferred embodiment of the present invention, the private data for an authorized user is encrypted at two stages, the client and server level, wherein FIG. 2 depicts the client level encryption from the perspective of the enhanced browser. The enhanced browser is a result of the integration of browser 116 and plug-in 118. The integrated actions of browser 116 and plug-in 118 are presented together as one operational flow, and each step indicates the active component of the enhanced browser performing the operation at that step. In the following flow, browser 116 and plug-in 118 interact with web application 120 on server computer 110.

In this example, prior to step 202, browser 116 was started on client computer 106 by the user, and web application 120 was selected.

Browser 116 authenticates if a user has permission to access web application 120 (step 202). In the preferred embodiment, browser 116 requests the input of a user login via UI 124 to verify the user has permission to use web application 120. Authentication may alternatively be through software or hardware keys. If the user login has the proper permission, browser 116 proceeds to the next step. If the user login does not have the proper permission, web application 120 will return an error message to browser 116 for display to the user via UI 124. In complex business environments, multiple servers running applications that work together for a business solution may require multiple logins by the same user, which can be time-consuming. Utilizing protocols, such as Lightweight Directory Access Protocol (LDAP), allow a "single sign-on" where one password for a user is shared between many services within a set of company resources. A person of ordinary skill in the art may recognize that there are other ways in which user authentication may be performed.

Browser 116 displays a web form via UI 124 based on input received from the user via UI 124 (step 204). In the preferred embodiment, after authentication, browser 116 receives user input regarding one or more web forms/web content selected by the user via UI 124. In the preferred embodiment, the selection of web forms include, but are not limited to, a form for collecting data to be stored in storage device 114, or a form for collecting search terms to use to query storage device 114 for retrieval of previously stored data. In an alternate embodiment, the browser may be directed to a specific web form automatically. Based on the user's selection, browser 116 retrieves the web form relevant to the user selection from web application 120. The relevant web form is consequently displayed to the user via UI 124.

In the preferred embodiment, after browser 116 displays via UI 124 an HTML web form containing HTML encryption tags around selected data fields, browser 116 receives user input via UI 124 for one or more data fields contained in the web form, which may correspond to user sensitive data, user non-sensitive data, or any combination thereof (step 206). For example, user sensitive data may include medical information, social security numbers, birth dates, credit card numbers, or anything that may not be desirable for other users to view; other data fields may be considered user non-sensitive data. Once the user input is received, browser 116 turns control of data processing over to plug-in 118 before anything is transmitted to web application 120.

Plug-in 118 identifies data fields in the web form tagged with HTML encryption tags (step 208). In the preferred embodiment of the present invention, browser 116 in conjunction with plug-in 118 becomes an enhanced browser with a field encryption component. The browser field encryption component identifies field encryption tags within the HTML document representing the form. The enhanced HTML code written for plug-in 118 includes special tags for "encryption" of select data fields, namely the user sensitive data fields. User sensitive data fields are placed between the two field encryption fields "<encrypt>" and "</encrypt>." The special tags may alternately take the form of an attribute "encrypt" under "type" within a form "input" line. To the user, the form displayed on UI 124 may or may not indicate which fields are to be encrypted. The encryption information is detailed within the HTML code and may not be visible to the user.

Plug-in 118 retrieves key1, or a first encryption key, from a local data storage location (step 210). In the preferred embodiment of the present invention, plug-in 118 creates a first encryption key for each user of web application 120, and stores the key locally on client computer 106. Plug-in 118 stores the created first encryption key as persistent data in an encrypted HTTP cookie, or in some other form of local data store on client computer 106. The first encryption key is never transmitted to another computer so the key cannot be intercepted by a hacker during transmission. If no first encryption key currently exists for the user, plug-in 118 requests the user to create a first encryption key via UI 124, or generates a first encryption key for the user. In a preferred embodiment, plug-in 118 specifies the form of the encryption key similar to a password, such that rules for length, type of characters, etc., may be expressed in many possible ways. In an alternate embodiment, the user may type in the first encryption key for each transaction via UI 124. A person of ordinary skill in the art may recognize that there are many ways to create or store an encryption key on a client computer.

Plug-in 118 retrieves key2, or a second encryption key, from a local data storage location (step 212). In a preferred embodiment of the present invention, plug-in 118 creates a second encryption key for each user of web application 120, and stores the key locally on client computer 106. In a preferred embodiment, plug-in 118 stores the created second encryption key as persistent data in an encrypted HTTP cookie, or some other form of local data store on client computer 106, or data store accessible by client computer 106. The second encryption key is transmitted on to other applications and may in certain circumstances be intercepted by a hacker. If no second encryption key currently exists for the user, plug-in 118 requests the user to create a second encryption key via UI 124, or generates a second encryption key for the user. A person of ordinary skill in the art may recognize that there are many ways to store a second encryption key on a client computer. In an alternate embodiment of the invention, where SQL wrapper 122 does not exist, plug-in 118 does not create nor retrieve key2.

In an alternate embodiment of the present invention, the first and second encryption keys are transmitted to a data store on a key server computer for persistent storage, and retrieved from the data store on the key server as needed. The key server computer is separate from server computers 102, 108, and 110, and client computer 106. Each user registers with the key server computer through a key server client application and stores one or more encryption keys on the key server computer. The user may also set permissions for secondary users to access the user's encryption key or keys. The permission for secondary users may be for temporary access, in the case of a technician helping the user fill out forms on browser 116, or for permanent access, in the case of a trusted professional needing constant access to the user's records, or for any access in-between where each type of permission is defined individually by the user. Registration of the user, and creating permission settings for secondary users may be provided through an additional browser plug-in on the key server client application. In the case where a secondary user does not have permission to access a primary user's data, web application 120 will send a message to the primary user requesting permission for the secondary user. The message could be through a text, email, a complementary smartphone application, or some other form of communication. The key server client application creates a token that can be embedded in an email and forwarded to the secondary user. The token includes a link to the key server with a token identifier which allows an already logged-in secondary user to use one or more decryption keys. The token may be for one time use, or may have a specified duration selectable by the primary user. The secondary user may receive a message indicating the allowed duration. The key server disables tokens as they expire. The primary user may establish rules about who can access the user's data ahead of any requests, such that the rules are tied to the system where the data is being used, and the length of time the secondary user has access to each key. The user may grant permission to one or both encryption keys. Since encryption of the data is separated by key1 and key2, the user may give permission to only one of the two keys, thereby giving permission to only certain types of data to secondary users. This would allow data mining of certain fields in the database while still protecting the most sensitive user information.

Plug-in 118 encrypts the identified data fields with key1, or the first encryption key (step 214). Plug-in 118 uses the first encryption key to encrypt any data within the identified data fields. The data fields were previously identified by the HTML field encryption tags. Plug-in 118 may encrypt data using any key encryption algorithm available to a person of ordinary skill in the art. Examples of key encryption algorithms include, but are not limited to: (a) symmetric key algorithms like AES, CASTS, RC4, DES, 3DES; or (b) asymmetric key algorithms. A person of ordinary skill in the art may recognize that there are many ways to perform encryption of data.

In the preferred embodiment, browser 116 takes the output from plug-in 118 and transmits both the encrypted and non-encrypted data from the web form to web application 120 on the application web server on server computer 110 via network 104 (step 216).

Plug-in 118 transmits key2, or the second encryption key, to web application 120 on server computer 110 via network 104 with the purpose of sending key2 on to SQL wrapper 122 (step 218). In an alternate embodiment of the invention, where SQL wrapper 122 does not exist, plug-in 118 does not send key2.

Step 216 and 218 may happen concurrently, or one at a time, in any order.

Browser 116 receives a result from web application 120, wherein the result is dependent on whether browser 116 requested to store data in or fetch data from storage device 114 (step 220). For example, if the data were stored in storage device 114, the result received may be a message indicating the task completed without errors. Storage application 112 creates the message, and transmits it to SQL wrapper 122 and then on to web application 120. Web application 120 transmits the message to browser 116, and browser 116 displays the message to the user via UI 124. If data was retrieved from storage device 114, subsequent to a search query, the result received may be one or more records of data transmitted to SQL wrapper 122. SQL wrapper 122 may modify the result, and then transmit the modified result to web application 120 for formatting into the enhanced HTML with encryption tags. Web application 120 formats the results into either a text message, an organized table of data, or a web form. Web application 120 transmits the enhanced HTML to browser 116. A person of ordinary skill in the art will recognize that there are other ways in which the response may be formatted or transmitted to the user.

In the case of data retrieved from storage device 114, browser 116 turns over the data processing to plug-in 118, and plug-in 118 identifies data fields needing decryption in the received HTML by searching for the encryption tags (step 222).

Plug-in 118 decrypts identified data fields with key1, or the first encryption key (step 224). The decrypted web content is ready for display to the user by browser 116.

Browser 116 displays the resulting web content to the user via UI 124 (step 226). The user does not see the encrypted form; the encryption and decryption process is seamless to the user.

Figure 3:
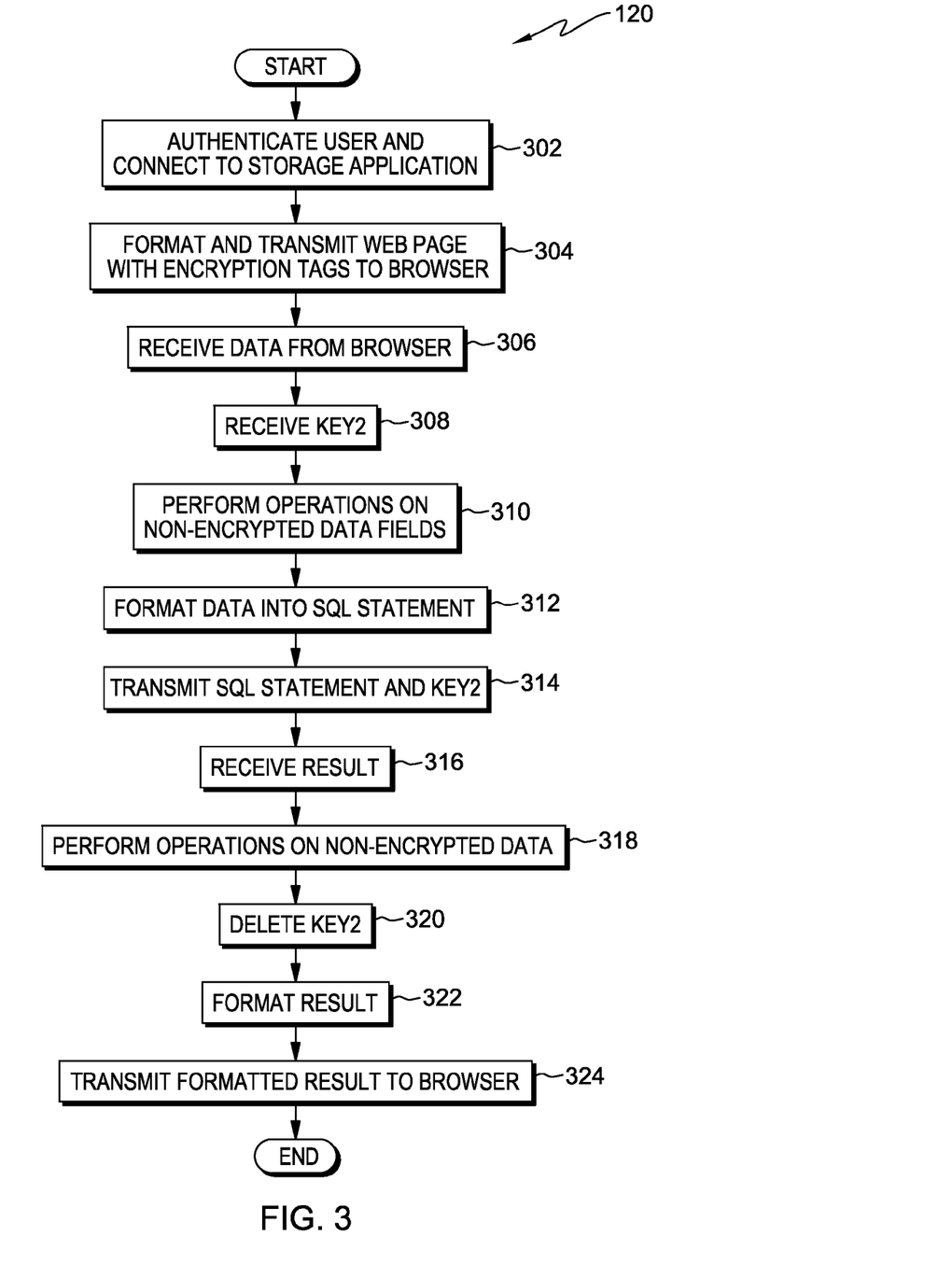
FIG. 3 is a flowchart depicting the operational steps of a web application, inserted on a server computer within the data processing system of FIG. 1, in accordance with an embodiment of the present invention.

FIG. 3 is a flowchart depicting the operational steps of web application 120, inserted on a server computer within the data processing system of FIG. 1, in accordance with an embodiment of the present invention. In the preferred embodiment of the present invention, the private data for an authorized user is encrypted at two stages, the client and server level, wherein FIG. 3 depicts client level encryption from the perspective of web application 120. In the following flow, web application 120 interacts with browser 116 and plug-in 118 on client computer 106, and with SQL wrapper 122 on server computer 108.

Web application 120 authenticates with user and connects to storage application 112 based on user input via UI 124 (step 302). In the preferred embodiment, browser 116 transmits user login information to web application 120 based on user input via UI 124. Web application 120 verifies whether the user credentials allow access to web application 120. If the user credentials do not allow access, web application 120 transmits a relevant message to browser 116, which is displayed to the user via UI 124. If the user credentials allow access, i.e., the user is authenticated, web application 120 transmits an initial web page containing links to one or more web forms/web content to browser 116, which is displayed to the user via UI 124. A list of users with allowable access is maintained by an administrator of web application 120. A Lightweight Directory Access Protocol (LDAP) may be utilized to allow a "single sign-on" where one password for a user is shared between many services within a set of company resources. A person of ordinary skill in the art may recognize that there are other ways in which user authentication may be performed.

After authenticating the user credentials, web application 120 connects to storage application 112. Web application 120 transmits a request to server computer 102 via network 104 to authenticate with storage application 112 for permission to access storage device 114. Authentication validates a user identity, and authorization determines the rights of a user to access an application or database. In the case where storage device 114 is a database, the rights of the user may include some or all of the following: the ability to read, update, delete, or retrieve data from specific database tables, to execute queries, to perform procedures, or to make structural changes to the database. In the preferred embodiment, web application 120 transmits a userid and password associated with a machine id to storage application 120 via network 104. The authentication request may generate one database connection for a single user, or several database connections forming a pool that multiple users can access. In an alternate embodiment, web application 120 may transmit to storage application 120 the user login information previously received from browser 116. A person of ordinary skill in the art may recognize that other methods exist to perform database authentications. Authentication of a user with storage application 112 and web application 120 may happen concurrently, or one at a time, in any order.

Web application 120 formats a web form with encryption tags, and transmits the web form to browser 116 (step 304). Responsive to user input regarding one or more web forms selectable by the user via UI 124, web application 120 formats the relevant form with HTML encryption tags to tag data fields needing encryption. After formatting, web application 120 transmits the web form to browser 116 for display to the user via UI 124.

Web application 120 receives data from browser 116 (step 306). Responsive to user input via UI 124 of the web form displayed by browser 116, web application 120 receives at least one encrypted data field processed by plug-in 118, and at least one unencrypted data field.

Web application 120 receives key2 from plug-in 118 (step 308). In the preferred embodiment, web application 120 receives the second encryption key with the purpose of transmitting the second key on to SQL wrapper 122. Web application 120 does not perform any encryption or decryption functions using the key. In an alternate embodiment of the invention, SQL wrapper 122 does not exist, and in that case, web application 120 does not receive key2.

Web application 120 performs operations on non-encrypted data fields (step 310). In the preferred embodiment, web application 120 performs operations on any unencrypted data fields. Many types of operations are possible, including, but not limited, to verifying format of dates, ordering lists alphabetically or numerically, checking spelling, searching for specific values, searching for related records, sending an email to a colleague, scheduling an appointment, or performing calculations. The user may be presented with a list of operations available via UI 124, or the application may perform operations automatically without user input.

Web application 120 formats the encrypted and non-encrypted data into an SQL statement (step 312). An SQL statement is a query or command designed for managing data stored in a database, such as storage device 114. For example, in the case of storing new data, an INSERT command may be created. In the case of deleting data, a DELETE command may be created. In the case of revising data, which is already stored in storage device 114, an UPDATE command may be created. In the case where the user wants to retrieve or fetch previously stored data, a SELECT command may be created. Not all commands are listed here, but it may be recognized that other commands exist to those skilled in the art. In a preferred embodiment, the SQL statement may look like "INSERT INTO Schema.Tablename (Namefield, birthdatefield, socialsecuritynum) VALUES ('Joe Smith', '01/01/2000', "BGJKLMQNPRIP")". In the preferred embodiment, some of the fields have been previously encrypted by plug-in 118, such as the value for socialsecuritynum in the above example. The SQL statement may take other forms depending on the table definitions in storage device 114, and the intent of the query or command.

Web application 120 transmits the SQL statement and key2, or the second encryption key to SQL wrapper 122 (step 314). In the preferred embodiment of the present invention, web application 120 transmits the SQL statement and key2 to SQL wrapper 122 on server computer 108 over network 104. In an alternate embodiment of the invention, the SQL statement is sent to storage application 112 without further field encryption, and in that case, web application 120 does not transmit key2.

Web application 120 receives a result from SQL wrapper 122, wherein the result is dependent on the type of SQL statement processed, such as storing data in storage device 114, or retrieving data from storage device 114 (step 316). In the preferred embodiment, if data was stored in storage device 114, the result may be a message indicating the task completed without errors. Storage application 112 creates the message, and transmits it to SQL wrapper 122. SQL wrapper 122 transmits the message to web application 120. If data was retrieved from storage device 114, subsequent to a search query, storage application 112 transmits the result, which may be one or more records of data, to SQL wrapper 122. SQL wrapper 122 may modify the result as needed, and transmits the modified result to web application 120.

Web application 120 performs operations on non-encrypted data (step 318). In the preferred embodiment, web application 120 performs operations on any retrieved data comprised of non-encrypted data fields. Many types of operations are possible, including, but not limited to verifying format of dates, ordering lists alphabetically or numerically, checking spelling, searching for specific values, searching for related records, sending an email to a colleague, scheduling an appointment, or performing calculations. The user may be presented with a list of operations available via UI 124, or the application may perform operations automatically without user input. In the case where only encrypted data exists, web application 120 does not perform any operations on the data.

Web application 120 deletes key2, or the second encryption key, from memory (step 320). The second encryption key is no longer needed, and is removed by web application 120 to prevent a hacker from retrieving the key when not in use. This step may happen any time after step 314.

Web application 120 formats the received result, wherein the received result is dependent on if data was stored in storage device 114, or retrieved from storage device 114 (step 322). In the embodiment, if data was stored in storage device 114, the result may be a message indicating the task completed without errors. Storage application 112 creates the message, and transmits it SQL wrapper 122 and then on to web application 120. Web application 120 transmits the message to browser 116, and browser 116 displays the message to the user via UI 124. If data was retrieved from storage device 114, subsequent to a search query, the received result may be one or more records of data transmitted to SQL wrapper 122. SQL wrapper 122 may modify the result, and then transmit the modified result to web application 120 for formatting into the enhanced HTML with encryption tags. Web application 120 formats the received result into either a text message, an organized table of data, or a web form. Web application 120 transmits the enhanced HTML to browser 116. In an alternate embodiment where plug-in 118 does not exist, the data is formatted into standard HTML and sent to browser 116. In other embodiments, web application 120 may use formatting including, but not limited to HTML, XML (Extensible Markup Language), or JSON (JavaScript Object Notation).

Web application 120 transmits the enhanced HTML formatted result to browser 116 (step 324). In an alternate embodiment, web application 120 transmits standard HTML formatted results to browser 116.

Figure 4:
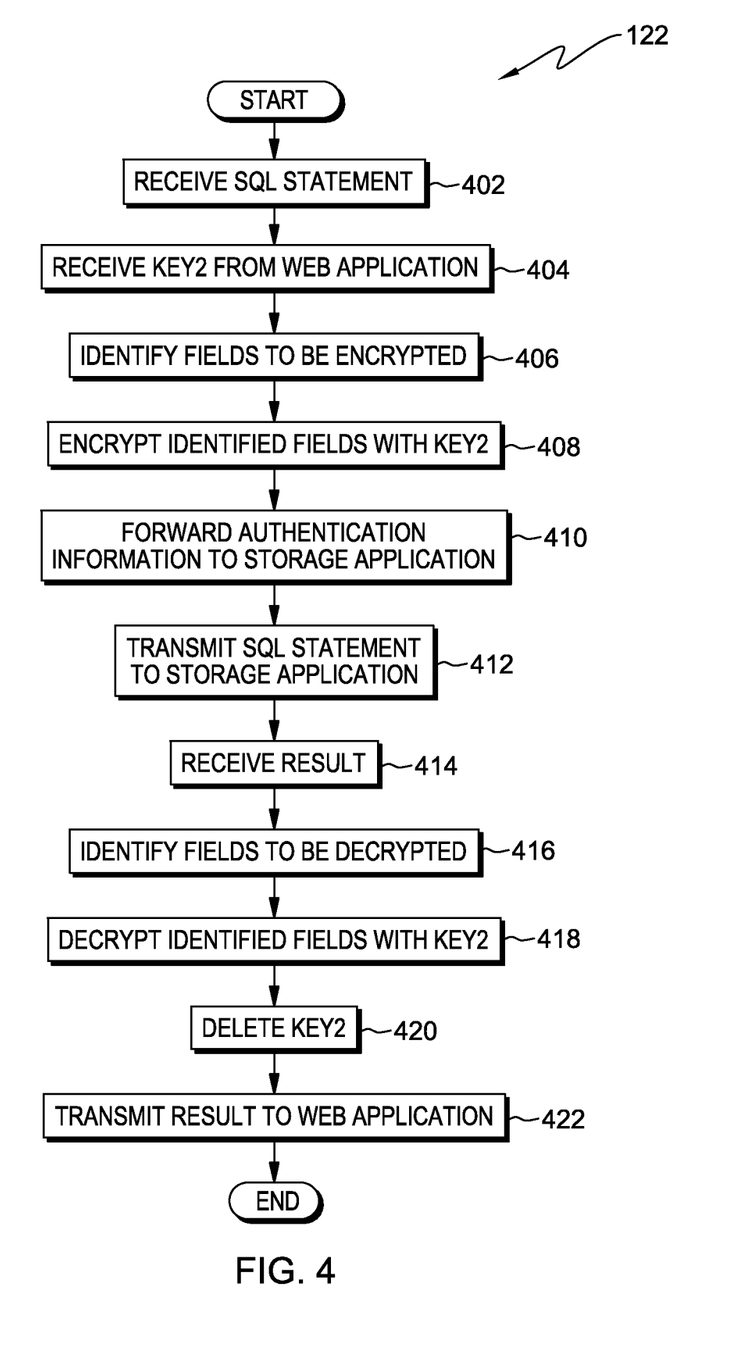
FIG. 4 is a flowchart depicting the operational steps of SQL wrapper 122 performing server level encryption of data fields, inserted on a server computer within the data processing system of FIG. 1, in accordance with an embodiment of the present invention.

FIG. 4 is a flowchart depicting the operational steps of SQL wrapper 122 performing server level encryption of data fields, inserted on a server computer within the data processing system of FIG. 1, in accordance with an embodiment of the present invention. In the preferred embodiment of the present invention, the private data for an authorized user is encrypted at two stages, the client and server level, wherein FIG. 4 depicts server level encryption from the perspective of SQL wrapper 122. In the following flow, SQL wrapper 122 interacts with web application 120 on server computer 110, and storage application 112 on server computer 102.

SQL wrapper 122 receives an SQL statement from web application 120 over network 104 (step 402). In the preferred embodiment of the present invention, SQL wrapper 122 receives at least one non-encrypted data field in an SQL statement from web application 120. In an alternate embodiment of a standard browser without a field encryption component, the SQL statement received may consist of all unencrypted data.

SQL wrapper 122 receives key2, or the second encryption key, from web application 120 over network 104 (step 404). SQL wrapper 122 receives the second encryption key for the purpose of encrypting select data fields in the received SQL statement.

SQL wrapper 122 identifies fields to be encrypted in the SQL statement received from web application 120 (step 406). These fields designated by the web application 120 to be encrypted by the SQL wrapper are in addition to the fields encrypted by the client computer 106. The database client uses a field encryption extended data definition language (feDDL) to define a schema with an encryption attribute for each data field. A database administrator creates the schema for each table which includes fields to be encrypted by SQL Wrapper 122. The files relating to the schema are accessible by SQL Wrapper 122. SQL wrapper 122 uses the schema to identify which fields need encryption within the received SQL statement.

SQL wrapper 122 encrypts the identified fields in the SQL statement with key2, or the second encryption key (step 408). SQL wrapper 122 may encrypt data using any key encryption algorithm available to a person of ordinary skill in the art. Examples of key encryption algorithms include, but are not limited to: (a) symmetric key algorithms like AES, CAST5, RC4, DES, 3DES; or (b) asymmetric key algorithms. In the case of asymmetrical algorithms, both encryption and decryption keys must be transmitted.

SQL wrapper 122 forwards the authentication information received from web application 120 for the connection to storage application 112 (step 410). Web application 120 created the connection to storage application 112. SQL wrapper 122 uses the connection to send SQL statements to storage application 112, and to receive a result from storage application 112.

SQL wrapper 122 transmits the SQL statement to storage application 112 on server computer 102 over network 104 (step 412). In the preferred embodiment, the SQL statement includes SQL commands and at least one field of encrypted data. SQL wrapper 122 transmits the SQL statement to storage application 112 for standard processing. In the preferred embodiment, if data is being stored in storage device 114, storage application 112 processes a standard SQL "INSERT" command. In the preferred embodiment, if data is being retrieved from storage device 114, storage application 112 processes the SQL command as a search query where "search values" equal "stored data". Storage application 112 compares at least one encrypted search value with the encrypted fields of stored data in the table, and identifies a result, i.e., set of table rows meeting the requirements. Comparing encrypted search values to encrypted stored values means no operation other than "=" is available. An example of a search clause on an encrypted field may be "SELECT*FROM Schema.Tablename WHERE socialsecuritynum='BGJKLMQNPRIP'". The field "socialsecuritynum" is an encrypted field, and the number 'BGJKLMQNPRIP' represents the encrypted form of the number entered by the user as a search value via UI 124. Multiple search values for multiple table fields may be included in the SQL statement, and each search value may be compared with stored data in the same manner. In the instance of a query where no encrypted fields are being searched, the SQL command may perform any type of comparison of "search values" to "stored values". A person skilled in the art will recognize that SQL statements, or queries, may be more complex than shown in the illustrative examples, and any combination of search terms for both encrypted and unencrypted fields may be included in the same SQL statement.

SQL wrapper 122 receives a result from storage application 112 over network 104 (step 414). Successful completion of the SQL statement by storage application 112 acting on storage device 114 results in an error message, a confirmation message, or a result being transmitted to SQL wrapper 122 from server computer 102 over network 104. In the case of an SQL SELECT statement, a result may be a set of records retrieved from the table in storage device 114 and transmitted to SQL wrapper 122. In the case of an SQL INSERT statement, a set of records may be inserted into the table in storage device 114, and a confirmation message may be transmitted to SQL wrapper 122. In the case of an SQL DELETE statement, a set of records may be deleted from the table in storage device 114, and a confirmation message may be transmitted to SQL wrapper 122. In the case of an SQL UPDATE statement, a set of records may be updated in the table in storage device 114, and a confirmation message may be transmitted to SQL wrapper 122. A person skilled in the art will recognize other SQL statements are possible and may be executed by storage application 112.

SQL wrapper 122 identifies fields in the result to be decrypted (step 416). In one embodiment, if data was stored in storage device 114, the result may be a message indicating the task completed without errors. Storage application 112 creates the message, transmits it to SQL wrapper 122, and then SQL wrapper 122 transmits it to web application 120. Web application 120 transmits the message to browser 116, and browser 116 displays the message to the user via UI 124. If data was retrieved from storage device 114, subsequent to a search query, the result may be one or more records of data transmitted to SQL wrapper 122. SQL wrapper 122 uses the schema to identify at least one data field needing to be decrypted in the one or more records of the result.

SQL wrapper 122 decrypts the at least one identified data field needing decryption with key2, or the second encryption key (step 418).

SQL wrapper 122 deletes key2, or the second encryption key (step 420). The second encryption key is no longer needed, and SQL wrapper 122 removes key2 from memory. This prevents a hacker from retrieving the key when the key is not in use.

SQL wrapper 122 transmits the decrypted result to web application 120 (step 422). In the exemplary embodiment, if data was stored in storage device 114, the result may be a message indicating the task completed with or without errors. In this case, SQL wrapper 122 transmits the message to web application 120. In the preferred embodiment, if data was retrieved from storage device 114, SQL wrapper 122 transmits the decrypted result to web application 120, wherein the result may include at least one decrypted data field.

Figure 5:
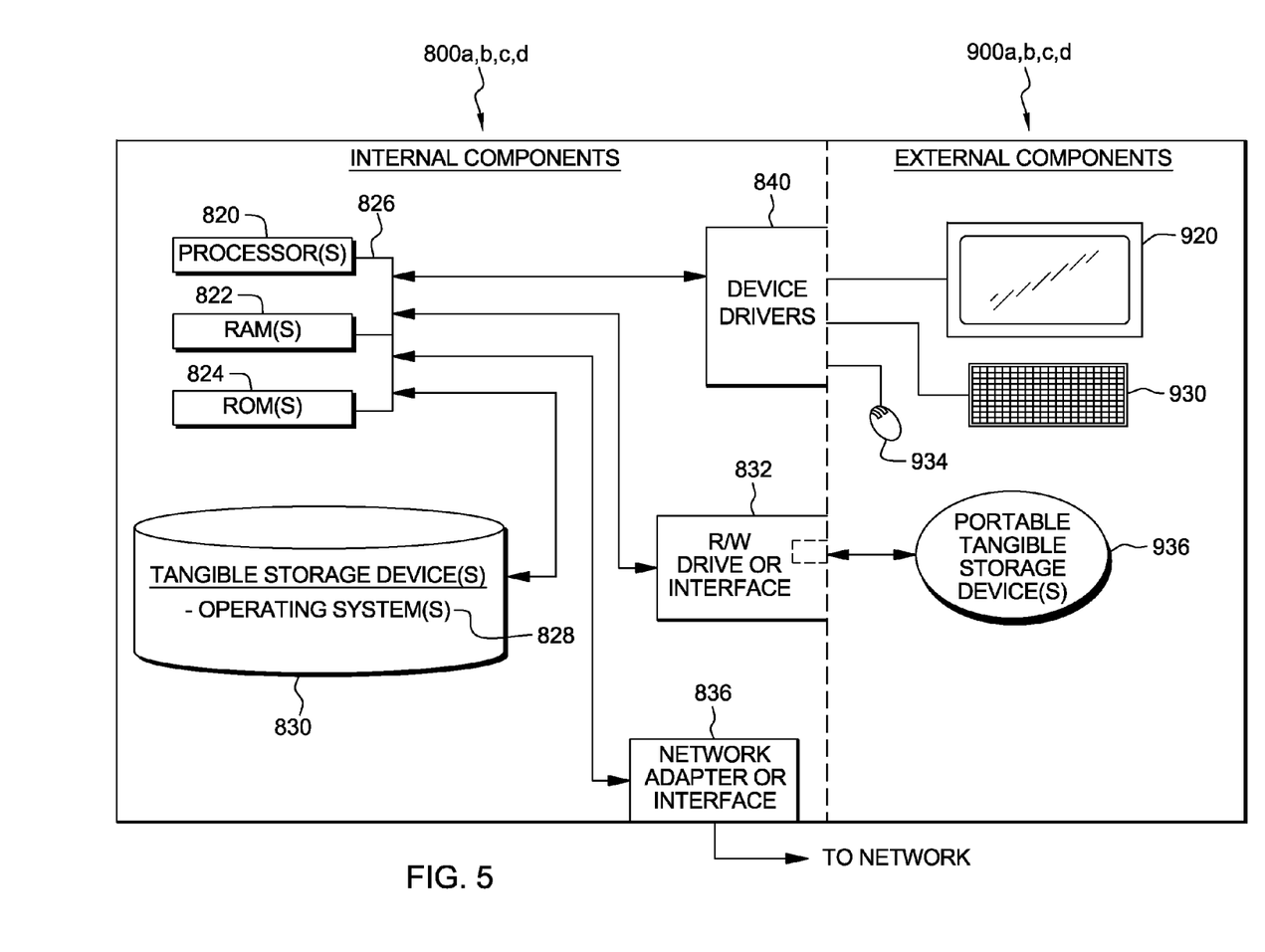
FIG. 5 depicts a block diagram of hardware and software within each of the computing devices of FIG. 1.

FIG. 5 depicts a block diagram of hardware and software within each of the computing devices of FIG. 1. It may be appreciated that FIG. 5 provides only an illustration of one implementation and does not imply any limitations with regard to the environments in which different embodiments may be implemented. Many modifications to the depicted system may be made.

Computing/processing devices server computers 102, 108, and 110, and client computer 106 include respective sets of internal components 800 a, b, c, d and external components 900 a, b, c, d illustrated in FIG. 5. Each of the sets of internal components 800 a, b, c, d includes one or more processors 820, one or more computer-readable RAMs 822 and one or more computer-readable ROMs 824 on one or more buses 826, one or more operating systems 828 and one or more computer-readable tangible storage devices 830. The one or more operating systems 828 and program storage application 112 in server computer 102; program SQL wrapper 122 in server computer 108; program web application 120 in server computer 110; and programs browser 116 and plug-in 118 in client computer 106 are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store and retain a computer program and digital information.

Each set of internal components 800 a, b, c, d also includes a R/W drive or interface 832 to read from and write to one or more portable computer-readable tangible storage devices 936 such as a CD-ROM, DVD, memory stick, magnetic tape, magnetic disk, optical disk or semiconductor storage device. The program storage application 112 in server computer 102; program SQL wrapper 122 in server computer 108; program web application 120 in server computer 110; and programs browser 116 and plug-in 118 in client computer 106 can be stored on one or more of the respective portable computer-readable tangible storage devices 936, read via the respective R/W drive or interface 832 and loaded into the respective hard drive or computer-readable tangible storage device 830. The term "computer-readable storage device" does not include a signal propagation media such as a copper transmission cable, an optical transmission fiber or a wireless transmission media.

Each set of internal components 800 a, b, c, d also includes a network adapter or interface 836 such as a TCP/IP adapter card or wireless communication adapter (such as a 4G wireless communication adapter using OFDMA technology). The program storage application 112 in server computer 102; program SQL wrapper 122 in server computer 108; program web application 120 in server computer 110; and programs browser 116 and plug-in 118 in client computer 106 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or computer-readable tangible storage device 830. The network may comprise copper transmission cables, optical transmission fibers, wireless transmission, routers, firewalls, switches, gateway computers and/or edge servers.

Each of the sets of external components 900 a, b, c, d includes a display screen 920, a keyboard or keypad 930, and a computer mouse or touchpad 934. Each of the sets of internal components 800 a, b, c, d also includes device drivers 840 to interface to display screen 920 for imaging, to keyboard or keypad 930, to computer mouse or touchpad 934, and/or to display screen for pressure sensing of alphanumeric character entry and user selections. The device drivers 840, R/W drive or interface 832 and network adapter or interface 836 comprises hardware and software (stored in computer-readable tangible storage device 830 and/or ROM 824).

The programs can be written in various programming languages (such as Java™ and C++) including low-level, high-level, object-oriented or non object-oriented languages. Alternatively, the functions of the programs can be implemented in whole or in part by computer circuits and other hardware (not shown).

Based on the foregoing, a computer system and program product have been disclosed in accordance with the present invention. However, numerous modifications and substitutions can be made without deviating from the scope of the present invention. Therefore, the present invention has been disclosed by way of example and not limitation.

What is claimed is:

1. A computer program product for encrypting data, the computer program product comprising:

one or more computer-readable storage devices, and program instructions stored on the one or more computer-readable storage devices, the program instructions comprising:

program instructions, for execution on a server computer system, to determine that a first data field of a plurality of data fields of a web form requires encryption, and in response, add a tag to the first data field in an HTML document representing the form to indicate that encryption is required for the first data field;

program instructions, for execution on the server computer system, responsive to a request by a client computer for the form, to send the HTML document with the encryption tag to the client computer for display to a user;

program instructions, for execution on the client computer, to receive from the user, data input to the first data field of the form while the form is displayed on the client computer, and in response to the data input and the encryption tag, to encrypt the first data field using a first encryption key;

program instructions, for execution on the client computer, responsive to a request from the user, to send the form with the encrypted first data field to the server computer system without sending the first encryption key or a corresponding first decryption key to the server computer system, the client computer deleting the form from the client computer in response to sending the form with the encrypted first data field to the server computer system, but retaining the first encryption key or the corresponding first decryption key; and program instructions, for execution on the server computer system, to store the form with the encrypted first data field, and to delete the form while still storing the encrypted first data field.

2. The computer program product of claim 1, further comprising:
program instructions, for execution on the server computer system, to encrypt with a second, different encryption key, data input by the user into a second data field of the form and store the encrypted second data field, the server computer system deleting the form with the unencrypted second data field in response to storing the encrypted second data field.

3. The computer program product as set forth in claim 1 further comprising:
program instructions, for execution on the server computer system, responsive to a request by the client computer for the web form and stored user data, to determine that the first data field of the form requires decryption, and in response to add a tag to the first data field indicating that the first data field requires decryption;
program instructions, for execution on the server computer system, to fetch the encrypted first data field, insert the encrypted first data field into the form, and send the form with the encrypted first data field to the client computer; and
program instructions, for execution on the client computer, responsive to receiving the form, to decrypt the first data field with the first encryption key and display the form with at least the decrypted first data field to the user.

4. The computer program product of claim 1, further comprising:
program instructions, for execution on the server computer system, to fetch the encrypted second data field, insert the encrypted second data field into the form, decrypt the second data field with the second encryption key, and send the form with the decrypted second data field to the client computer; and
program instructions, for execution on the client computer, responsive to receiving the form, to display the form with at least the decrypted second data field to the user.

5. The computer program product of claim 1, further comprising:
program instructions, for execution on the client computer, to receive user input, wherein the first user specific encryption key is created on the client computer based on user input; and
program instructions, for execution on the client computer, to store the first user specific encryption key on the client computer.

6. The computer program product of claim 1, further comprising:
program instructions, for execution on the client computer, to receive user input, wherein a second user specific encryption key is created on the client computer based on user input;
program instructions, for execution on the client computer, to store the second user specific encryption key on the client computer; and
program instructions, for execution on server computers, to remove the second user specific encryption key.

7. The computer program product of claim 1, further comprising:
program instructions, for execution on the server computer system, to determine that a user has access to the web form, based on user credentials; and program instructions, for execution on the server computer system, to determine that a user has access to the stored user data, based on user credentials.

8. A computer system for encrypting data, the computer system comprising:
one or more computer processors, one or more computer-readable memories, one or more computer-readable storage devices, and program instructions stored on the one or more storage devices for execution by the one or more processors via the one or more memories, the program instructions comprising:
program instructions, for execution on a server computer system, to determine that a first data field of a plurality of data fields of a web form requires encryption, and in response, add a tag to the first data field in an HTML document representing the form to indicate that encryption is required for the first data field;
program instructions, for execution on the server computer system, responsive to a request by a client computer for the form, to send the HTML document with the encryption tag to the client computer for display to a user;
program instructions, for execution on the client computer, to receive from the user, data input to the first data field of the form while the form is displayed on the client computer, and in response to the data input and the encryption tag, to encrypt the first data field using a first encryption key;
program instructions, for execution on the client computer, responsive to a request from the user, to send the form with the encrypted first data field to the server computer system without sending the first encryption key or a corresponding first decryption key to the server computer system, the client computer deleting the form from the client computer in response to sending the form with the encrypted first data field to the server computer system, but retaining the first encryption key or the corresponding first decryption key; and
program instructions, for execution on the server computer system, to store the form with the encrypted first data field, and to delete the form while still storing the encrypted first data field.

9. The computer system of claim 8, further comprising:
program instructions, for execution on the server computer system, to encrypt with a second, different encryption key, data input by the user into a second data field of the form and store the encrypted second data field, the server computer system deleting the form with the unencrypted second data field in response to storing the encrypted second data field.

10. The computer system of claim 8, further comprising:
program instructions, for execution on the server computer system, responsive to a request by the client computer for the web form and stored user data, to determine that the first data field of the form requires decryption, and in response to add a tag to the first data field indicating that the first data field requires decryption;
program instructions, for execution on the server computer system, to fetch the encrypted first data field, insert the encrypted first data field into the form, and send the form with the encrypted first data field to the client computer; and
program instructions, for execution on the client computer, responsive to receiving the form, to decrypt the first data field with the first encryption key and display the form with at least the decrypted first data field to the user.

11. The computer system of claim 8, further comprising:
program instructions, for execution on the server computer system, to fetch the encrypted second data field, insert the encrypted second data field into the form, decrypt the second data field with the second encryption key, and send the form with the decrypted second data field to the client computer; and
program instructions, for execution on the client computer, responsive to receiving the form, to display the form with at least the decrypted second data field to the user.

12. The computer system of claim 8, further comprising:
program instructions, for execution on the client computer, to receive user input, wherein the first user specific encryption key is created on the client computer based on user input; and
program instructions, for execution on the client computer, to store the first user specific encryption key on the client computer.

13. The computer system of claim 8, further comprising:
program instructions, for execution on the client computer, to receive user input, wherein a second user specific encryption key is created on the client computer based on user input;
program instructions, for execution on the client computer, to store the second user specific encryption key on the client computer; and
program instructions, for execution on server computers, to remove the second user specific encryption key.

14. The computer system of claim 8, further comprising:
program instructions, for execution on the server computer system, to determine that a user has access to the web form, based on user credentials; and
program instructions, for execution on the server computer system, to determine that a user has access to the stored user data, based on user credentials.

15. A computer system for encrypting data, the computer system comprising:
one or more computer processors;
one or more computer-readable storage devices;
program instructions stored on the computer-readable storage devices for execution by at least one of the one or more processors, the program instructions comprising:
program instructions, for execution on a server computer system, responsive to a request by a client computer of a secondary user to retrieve a web form and at least one stored data field of a primary user, to determine that a first data field of the form requires decryption, and in response to add a tag to the first data field indicating that the first data field requires decryption;
program instructions, for execution on the server computer system, to verify the authorization of the secondary user to access the stored data of a primary user;
program instructions, for execution on the server computer system, to fetch the encrypted first data field of the primary user, insert the encrypted first data field into the form, store the form with the encrypted first data field after inserting the encrypted first data field into the form, send the form with the encrypted first data field to the client computer of the secondary user, and delete the form with the encrypted first data field in response to sending the form with the encrypted first data field;
program instructions, for execution on the client computer, responsive to receiving the form, to decrypt the first data field with a first encryption key and display the form with at least the decrypted first data field to the secondary user.

16. The computer system of claim 15, further comprising:
program instructions, for execution on the server computer system, to fetch the encrypted second data field of the primary user, insert the encrypted second data field into the form, decrypt the second data field with the second encryption key, and send the form with the decrypted second data field to the client computer of the secondary user; and
program instructions, for execution on the client computer, responsive to receiving the form, to display the form with at least the decrypted second data field to the secondary user.

17. The computer system of claim 15, further comprising:
program instructions, for execution on the client computer, to receive input from a primary user, wherein the first user specific encryption key is created on the client computer based on user input;
program instructions, for execution on the server computer system, to store the first user specific encryption key on a key server computer;
program instructions, for execution on the client computer, to receive input from a primary user, wherein a second user specific encryption key is created on the client computer based on user input;
program instructions, for execution on the server computer system, to store the second user specific encryption key on the key server computer;
program instructions, for execution on the client computer, to receive input from the primary user, wherein permission for access and a specified duration of access to the first user specific encryption key by a secondary user is created on the client computer based on primary user input;
program instructions, for execution on the server computer system, to store the permission for access and duration of access to the first user specific encryption key by the secondary user on the key server computer;
program instructions, for execution on the client computer, to receive input from the primary user, wherein permission for access and the specified duration of access to the second user specific encryption key by the secondary user is created on the client computer based on primary user input; and
program instructions, for execution on the server computer system, to store the permission for access and duration of access to the second user specific encryption key by the secondary user on the key server computer.

18. The computer system of claim 15, further comprising:
program instructions, for execution on the server computer system, to determine that the primary user has access to the web form, based on user credentials; and
program instructions, for execution on the server computer system, to determine that the primary user has access to the stored user data, based on user credentials.

19. The computer system of claim 15, wherein program instructions, for execution on the server computer system, to verify the authorization of the secondary user to access the stored data of the primary user comprises:
program instructions, for execution on the server computer system, to determine that the secondary user has access to the web form, based on user credentials; and
program instructions, for execution on the key server computer, to determine that the secondary user has permission to access the stored data of the primary user using the first user specific encryption key, the second user specific encryption key, or both, and in response to having permission, allowing the secondary user access to one or both user specific encryption keys for the specified duration of access.

20. The computer system of claim 15, wherein program instructions, for execution on the server computer system, to verify the authorization of the secondary user to access the stored data of the primary user comprises:
- program instructions, for execution on the server computer system, to determine that the secondary user has access to the web form, based on user credentials;
- program instructions, for execution on the key server computer, to determine that the secondary user has permission to access the stored data of the primary user using the first user specific encryption key, the second user specific encryption key, or both, and in response to not having permission, sending a request to the primary user to grant the secondary user access to one or both user specific encryption keys for a specified duration of access; and
- program instructions, for execution on the key server computer, in response to the primary user granting the secondary user permission, allowing the secondary user access to one or both user specific encryption keys for the specified duration of access.

* * * * *